(12) United States Patent
Ling et al.

(10) Patent No.: US 11,211,857 B2
(45) Date of Patent: Dec. 28, 2021

(54) LINEAR VIBRATION MOTOR HAVING ACCOMMODATION SPACES PROVIDED FOR MAGNETS IN A SUPPORT MEMBER

(71) Applicant: AAC Technologies Pte. Ltd., Singapore (SG)

(72) Inventors: Fanghua Ling, Shenzhen (CN); Feng Tao, Shenzhen (CN); Xiaofeng Pu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 161 days.

(21) Appl. No.: 16/706,853

(22) Filed: Dec. 9, 2019

(65) Prior Publication Data

US 2020/0212774 A1    Jul. 2, 2020

(30) Foreign Application Priority Data

Dec. 30, 2018   (CN) .......................... 201822279152.6

(51) Int. Cl.
*H02K 33/00*   (2006.01)
*H02K 1/34*    (2006.01)
(Continued)

(52) U.S. Cl.
CPC ............ *H02K 33/00* (2013.01); *B06B 1/045* (2013.01); *H02K 1/34* (2013.01); *H02K 5/04* (2013.01); *H02K 41/02* (2013.01)

(58) Field of Classification Search
CPC . B06B 1/045; H02K 1/34; H02K 5/04; H02K 5/24; H02K 33/00; H02K 33/02; H02K 33/06; H02K 33/16; H02K 41/02
(Continued)

(56) References Cited

U.S. PATENT DOCUMENTS

2018/0297067 A1* 10/2018 Huang .................... H02K 33/02
2018/0297069 A1* 10/2018 Hua ........................ H02K 33/16
(Continued)

FOREIGN PATENT DOCUMENTS

| CN | 102025256 B2 | 4/2011 |
| CN | 209389907 B1 | 9/2019 |
| CN | 209389912 B1 | 9/2019 |

OTHER PUBLICATIONS

PCT search report dated Jan. 15, 2020 by SIPO in related PCT Patent Application No. PCT/CN2019/111100 (4 Pages).

*Primary Examiner* — Tulsidas C Patel
*Assistant Examiner* — Rashad H Johnson
(74) *Attorney, Agent, or Firm* — W&G Law Group

(57) ABSTRACT

A linear vibration motor includes a housing with a first accommodation space, a vibration unit, an elastic part and a coil assembly fixed on the housing. The vibrating unit includes a support connected with the elastic part, and includes a top wall perpendicularly to a vibrating direction of the vibrating unit, a side wall bending and extending from a periphery of the top wall, a through hole penetrating the top wall, and two separation walls respectively bending and extending from the two opposite sides of the through hole. The top wall and the side wall enclose to form a second accommodation space which is divided by the two separation walls into a main accommodation space and two auxiliary accommodation spaces. The linear vibration motor further includes at least one weight block accommodated and fixed in the auxiliary accommodation spaces, and at least one magnet respectively fixed to the support.

8 Claims, 3 Drawing Sheets

(51) Int. Cl.
  *H02K 41/02* (2006.01)
  *H02K 5/04* (2006.01)
  *B06B 1/04* (2006.01)

(58) Field of Classification Search
  USPC .............. 310/10, 15–17, 25, 28, 36–37, 51
  See application file for complete search history.

(56) References Cited

U.S. PATENT DOCUMENTS

| | | | |
|---|---|---|---|
| 2018/0297078 A1* | 10/2018 | Xu .......................... | B06B 1/045 |
| 2020/0044528 A1* | 2/2020 | Tang ...................... | H02K 33/08 |
| 2020/0044534 A1* | 2/2020 | Tang ...................... | H02K 33/12 |
| 2021/0067021 A1* | 3/2021 | Maeda .................. | H02K 33/18 |

\* cited by examiner

LINEAR VIBRATION MOTOR HAVING ACCOMMODATION SPACES PROVIDED FOR MAGNETS IN A SUPPORT MEMBER

FIELD OF THE PRESENT INVENTION

The present invention relates to a vibration motor, particularly a linear vibration motor used in a portable consumer electronic product.

DESCRIPTION OF RELATED ART

With the development of electronic technology, portable consumer electronic products are more and more favored by people, such as mobile phones, handheld game consoles, navigation devices or handheld multimedia entertainment devices. These electronic products generally use vibration motors for system feedback, such as the call reminder, information reminder and navigation reminder of mobile phones, vibration feedback of game consoles, etc. For such wide applications, the vibration motor is required to have high performance, good stability and long service life.

In relevant technologies, the linear vibration motor comprises a housing with an accommodation space, a vibrating unit accommodated in the accommodation space, an elastic part suspending the vibrating unit in the accommodation space, and a coil assembly fixed on the housing and driving the vibrating unit to vibrate, wherein, the vibrating unit comprises a support fixedly supporting the elastic part, weight blocks respectively fixed at the two opposite sides of the support, and magnets fixed at two opposite sides of the support.

However, when the magnets are assembled in relevant technologies, the magnets and the support need to be counterpointed at first, but the counterpointing work is easy to have a counterpointing deviation which cannot conveniently ensure the assembling precision between the magnets and the support and makes the assembling work be difficult. In addition, the magnets are directly glued at the inner side of the support and cannot be sufficiently supported but are easy to disconnect during vibration, and therefore, the vibrating reliability of the linear vibration motor is influenced.

Thus, it is necessary to provide an improved linear vibration motor to solve the problems above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present invention.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present invention more apparent, the present invention is described in further detail together with the figures and the embodiment. It should be understood the specific embodiment described hereby is only to explain the invention, not intended to limit the invention.

Figure 1:
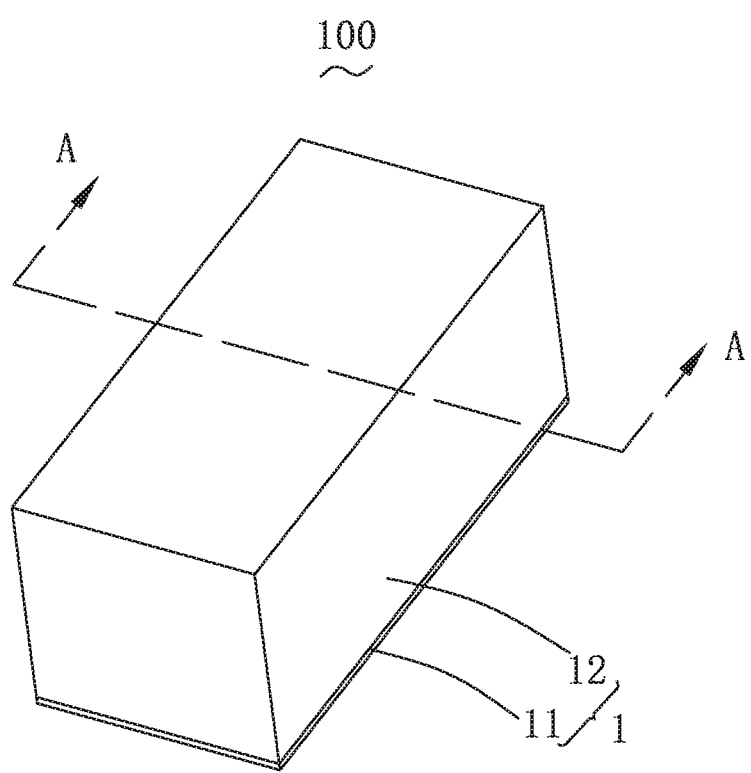
FIG. 1 is an isometric view of a linear vibration motor in accordance with an exemplary embodiment of the present invention.
Figure 2:
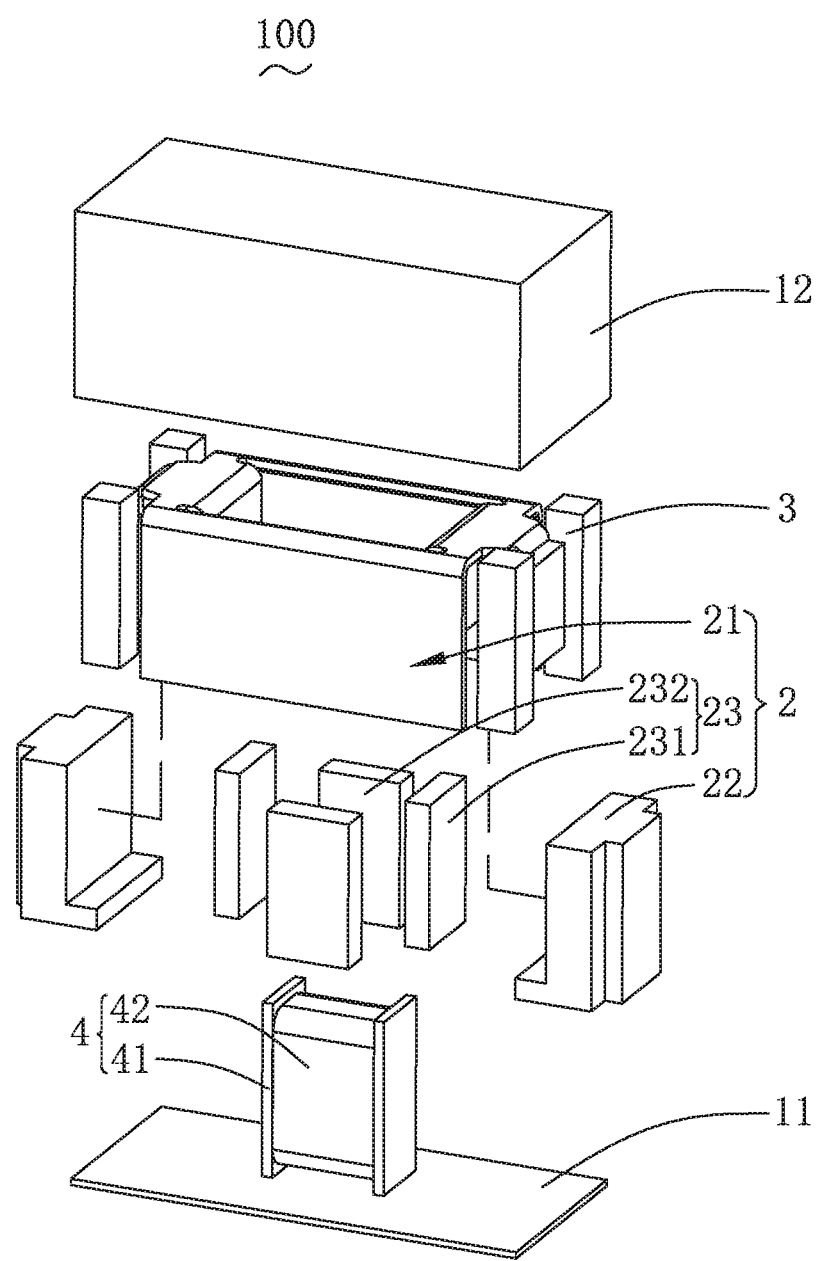
FIG. 2 is an exploded and isometric view of the linear vibration motor in FIG. 1.

Please refer to FIGS. 1-2 at the same time, the present invention provides a linear vibration motor 100 which comprises a housing 1 with a first accommodation space 10, a vibrating unit 2, an elastic part 3 and a coil assembly 4.

The housing 1 comprises a bottom plate 11 and an upper cover 12, wherein, the upper cover 12 covers the bottom plate 11 and encloses with the bottom plate 11 to form the first accommodation space 10.

Figure 3:
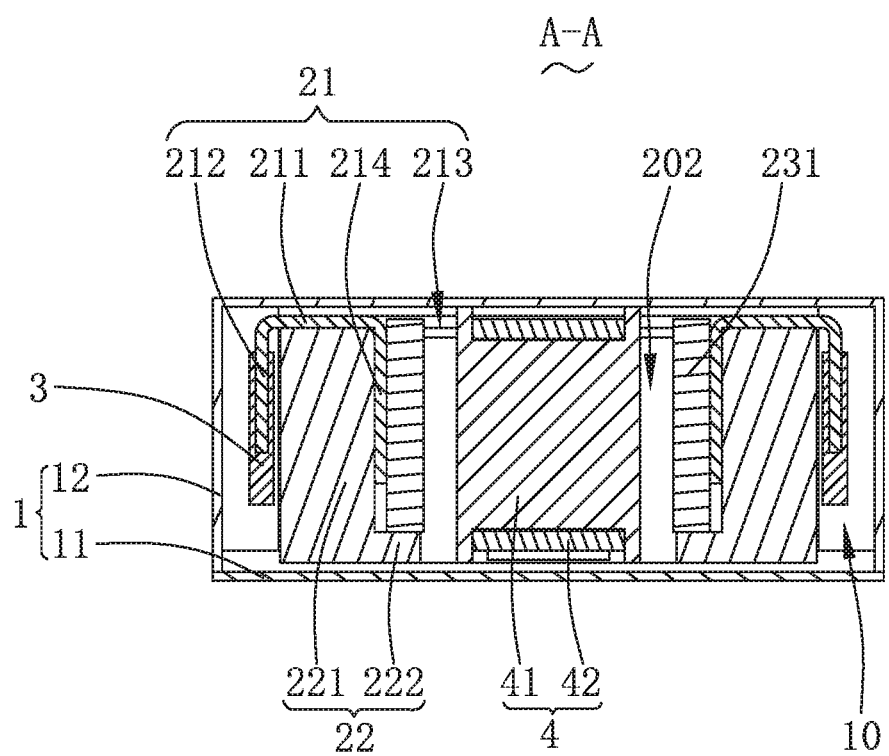
FIG. 3 is a cross-sectional view of the linear vibration motor taken along line A-A in FIG. 1.
Figure 4:
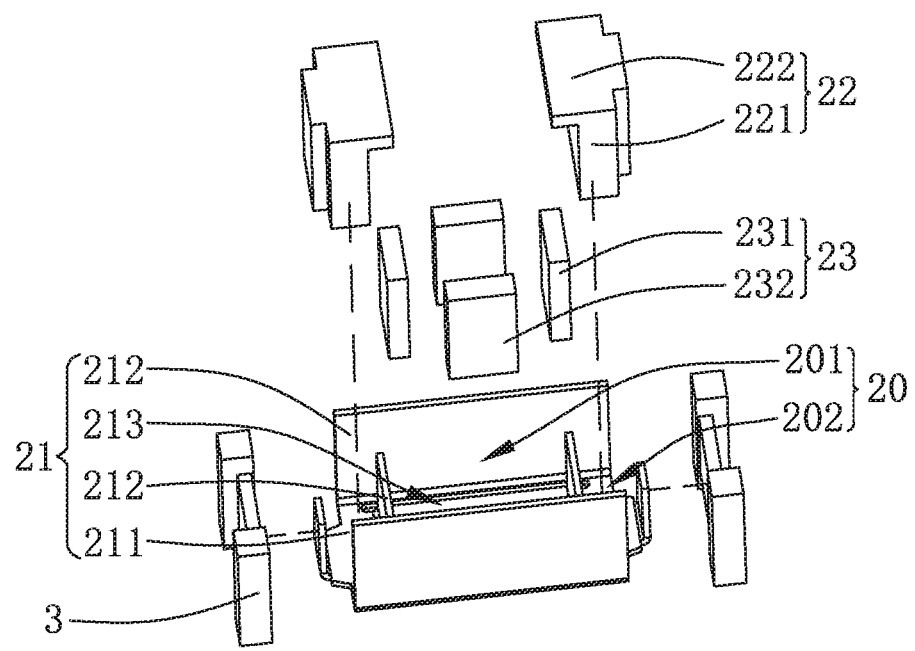
FIG. 4 is a partially assembled view of the linear vibration motor.

Please refer to FIGS. 2-4 at the same time, the vibrating unit 2 is arranged in the first accommodation space 10. In the embodiment, the vibrating unit 2 is supported and suspended by the elastic part 3 in the first accommodation space 10, and the coil assembly 4 is fixed to the housing 1 and drives the vibrating unit 2 to vibrate.

Specifically, the vibrating unit 2 comprises a support 21 fixedly supporting the elastic part 3, and weight blocks 22 and magnets 23 respectively fixed to the support 21.

Further, the support 21 comprises a top wall 211 arranged perpendicularly to the vibrating direction of the vibrating unit 2, a side wall 212 bending and extending from the periphery of the top wall 211, a through hole 213 penetrating the top wall 211, and two separation walls 214 respectively bending and extending from the two opposite sides of the through hole 213. In the embodiment, the support 21 is rectangular, and the two separation walls 214 are parallel to the short axis of the support 21.

The top wall 211 and the side wall 212 enclose to form a second accommodation space 20. The two separation walls 214 separate the second accommodation space 20 into a main accommodation space 201 and two auxiliary accommodation spaces 202 located at the two opposite sides of the main accommodation space 201. The main accommodation space 201 and the through hole 213 are arranged face to face and communicated. Two weight blocks 21 are arranged in total and respectively fixedly accommodated in the two auxiliary accommodation spaces 202. The magnets 23 comprise two first magnets 231 which are located in the main accommodation space 201 and respectively closely fixed to the two separation walls 214. The coil assembly 4 extends into the main accommodation space 201 and has intervals from the magnets 23.

Of course, the positions of the separation walls 214 are not limited by above. The separation walls 214 can also be arranged parallel to the long axis direction of the support 21.

In the structure above, when assembled, the weight blocks 22 are directly fixedly accommodated in the auxiliary accommodation spaces 202 for precisely positioning the weight blocks 22 and the support 21, which increases the assembling precision and saves the work for counterpointing the weight blocks 22 with the support 21, and therefore, the assembling work is easier and simplified.

Further, the weight blocks 22 comprise weight block bodies 221 and support walls 222, wherein, the weight block bodies 221 are accommodated and fixed in the auxiliary accommodation spaces 202, and the support walls 222 bend and extend into the main accommodation space 201 from the ends of the weight block bodies 221 far away from the top wall 211. The first magnets 231 butt and are supported by the support walls 222.

When assembled, the support walls 222 directly fix the first magnets 231 at the assembling positions for precisely positioning the first magnets 23 and the separation walls 214, which increases the assembling precision and saves the work for counterpointing the first magnets 231 with the separation walls 214, and therefore, the assembling work is easier and simplified. At the same time, the support walls 222 support the first magnets 231, which can more reliably assemble the first magnets 231 and the support 21 and prevents the first magnets 231 from disconnecting during vibration, and therefore, the vibrating reliability of the linear vibration motor 100 is high.

For improving the vibrating performance of the vibrating unit 2, the magnets 23 in the embodiment are also additionally provided with two second magnets 232 accommodated in the main accommodation space 201. The two second magnets 232 are respectively fixed to the two opposite side walls 212 which are parallel to the long axis of the support 21. The arrangement of the second magnets 232 increases magnetic field intensity and makes the driving force generated between the coil assembly 4 and the magnets 23 be stronger, and therefore, the vibrating performance of the linear vibration motor 100 is further improved.

Please refer to FIGS. 2-3, the elastic part 3 suspends the vibrating unit 2 in the first accommodation space 10, namely, one end of the elastic part 3 is fixed to the vibrating unit 2, and the other end is fixed to the housing 11. Specifically, the elastic part 3 is fixed in the upper cover 12 of the housing 1, and suspends the vibrating unit 2 in the upper cover 12.

The coil assembly 4 is fixed to the housing 1 and drives the vibrating unit 2 to vibrate. In the embodiment, the coil assembly 4 is fixed to the bottom plate 11.

Specifically, the coil assembly 4 comprises an iron core 41 fixed to the housing 1, and a coil 42 winding the iron core 41.

In the embodiment, specifically, the coil assembly 4 is fixedly arranged on the bottom plate 11, and arranged with the two first magnets 23 face to face with intervals. After the coil 42 is electrified, the iron core 41 forms a magnetic field which interacts with the magnetic field of the first magnets 23 so as to drive the vibrating unit 2 to carry out reciprocating linear motion and generate the vibrating effect.

Compared with relevant technologies, the linear vibration motor provided by the present invention is characterized in that the support is provided with the second accommodation space. The two separation walls separate the second accommodation space into a main accommodation space and two auxiliary accommodation spaces located at the two opposite sides of the main accommodation space. The main accommodation space and the through hole are arranged face to face and communicated. Two weight blocks are arranged in total and respectively fixedly accommodated in the two auxiliary accommodation spaces. The magnets comprise first magnets which are located in the main accommodation space and respectively closely fixed to the two separation walls. The coil assembly extends into the main accommodation space and has intervals from the magnets. In the structure above, when assembled, the weight blocks are directly fixedly accommodated in the auxiliary accommodation spaces for precisely positioning the weight blocks and the support, which increases the assembling precision and saves the work for counterpointing the weight blocks with the support, and therefore, the assembling work is easier and simplified.

It is to be understood, however, that even though numerous characteristics and advantages of the present exemplary embodiment have been set forth in the foregoing description, together with details of the structures and functions of the embodiment, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor including:
a housing with a first accommodation space;
a vibrating unit in the first accommodation space;
an elastic part for suspending the vibrating unit in the first accommodation space;
a coil assembly fixed to the housing for driving the vibrating unit to vibrate; wherein
the vibrating unit comprises
a support connected with the elastic part, and includes a top wall arranged perpendicularly to a vibrating direction of the vibrating unit, a side wall bending and extending from a periphery of the top wall, a through hole penetrating the top wall, and two separation walls respectively bending and extending from the two opposite sides of the through hole; the top wall and the side wall enclosing to form a second accommodation space which is divided by the two separation walls into a main accommodation space and two auxiliary accommodation spaces located at the two opposite sides of the main accommodation space; the main accommodation space being disposed opposite to and communicated with the through hole; and wherein
the linear vibration motor further comprises at least one weight block accommodated and fixed in the auxiliary accommodation spaces, and at least one magnet respectively fixed to the support; the at least one magnet being located in the main accommodation space and closely fixed to the separation walls.

2. The linear vibration motor according to claim 1, wherein the at least one magnet includes two first magnets respectively fixed to the two separation walls.

3. The linear vibration motor according to claim 2, wherein the support is rectangular, and the two separation walls are parallel to a short axis of the support.

4. The linear vibration motor according to claim 3, wherein the at least one magnet further comprises two second magnets accommodated in the main accommodation space, and the two second magnets are respectively fixed to the two opposite side walls parallel to a long axis of the support.

5. The linear vibration motor according to claim 1, wherein the weight blocks comprise weight block bodies accommodated and fixed in the auxiliary accommodation spaces, and support walls; the support walls bend and extend into the main accommodation space from the ends of the weight block bodies far away from the top wall; the first magnets abut against the support walls.

6. The linear vibration motor according to claim 1, wherein the housing comprises a bottom plate and an upper cover for cooperatively forming the first accommodation space; the elastic part is fixed at the inner side of the upper cover and suspends the vibrating unit in the upper cover; the coil assembly is fixed on the bottom plate.

7. The linear vibration motor according to claim 6, wherein the coil assembly comprises an iron core fixed to the bottom plate, and a coil winding the iron core.

8. The linear vibration motor according to claim 1, wherein the coil assembly extends into the main accommodation space and is arranged with intervals from the at least one magnet.

\* \* \* \* \*